April 18, 1961 J. D. SULLIVAN 2,980,553
GLASS COATED STEEL ARTICLE AND METHOD OF MAKING THE SAME
Filed June 23, 1958
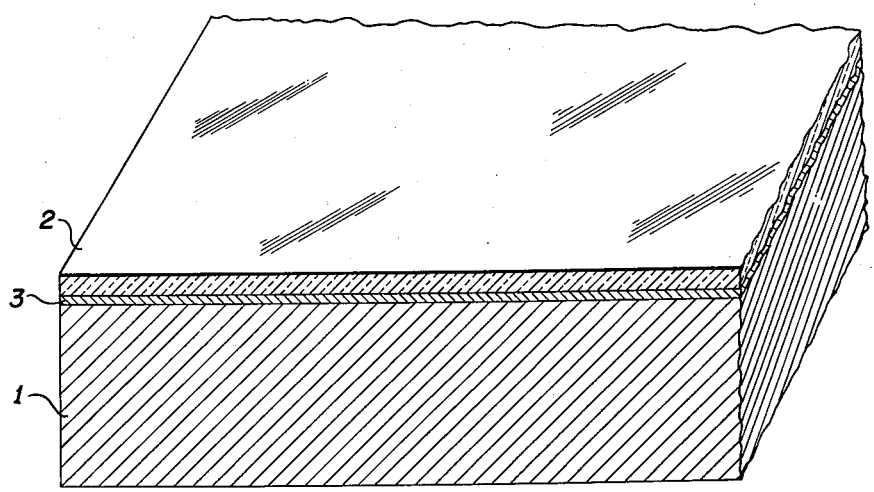
INVENTOR.
JAMES D. SULLIVAN
BY
Attorneys ున
United States Patent Office 2,980,553
Patented Apr. 18, 1961

2,980,553

GLASS COATED STEEL ARTICLE AND METHOD OF MAKING THE SAME

James D. Sullivan, Milwaukee, Wis., assignor to A. O. Smith Corporation, Milwaukee, Wis., a corporation of New York Filed June 23, 1958, Ser. No. 743,589

9 Claims. (Cl. 117—70)

This invention relates to a glass coated ferrous article and to a method of pre-coating the steel surface prior to glass coating to reduce boiling and copperheading defects in the glass.

In the glass coating of steel articles, the glass is fused to the steel by firing the article at an elevated temperature generally in the range of 1200° F. to 1600° F. During the firing, oxygen from the oxides of the glass composition or from the furnace atmosphere react with the carbon in the steel base to form carbon dioxide and carbon monoxide and these gases form bubbles which boil out of the molten glass to form blisters or pits in the glass surface. If the pits are partially healed over by the molten glass, these defects are commonly referred to as copperheads.

To eliminate the boiling and copperheading defects in the glass coating, attempts have been made in the past to use low carbon steel or to employ atmosphere firing in which the amount of oxygen in the firing atmosphere is controlled by the use of an inert gas. In addition to this, glass compositions have been modified to improve the wettability of the glass so that the glass will flow more easily and heal the defects.

The present invention is directed to a new and improved method of decreasing the boiling and copperheading defects in the glass coating. The method of the invention tends to eliminate the requirement for the more expensive low carbon steel and atmosphere firing and enables a wider variety of glass compositions to be employed. According to the invention, the ferrous base is coated with a layer of barium phosphate prior to glassing and during the firing of the glass, the barium phosphate coating acts to reduce the boiling of the glass and the resulting boiling defects.

The coating of the invention results in a more dense layer of glass on the ferrous surface due to the reduction in the boiling tendencies and therefore, provides a greater amount of protection for the ferrous base. In addition, the coating is applied directly to the ferrous base and does not require any heat treatment prior to the coating with glass to oxidize the coating.

In a modified form of the invention, the barium phosphate is combined with nickelous oxide and this mixture is applied to the steel base prior to glassing. The nickelous oxide coating, as set forth in the copending application, Serial No. 689,995, now Patent No. 2,940,865, issued June 14, 1960, of the same inventor, entitled "Method of Applying a Glass Coating to Steel by Using an Intermediate Layer of Nickelous Oxide and Article Produced Thereby," tends to eliminate hydrogen defects, such as fishscaling, in the glass coating as well as promoting adherence between the glass and the steel. The barium phosphate combines with the nickelous oxide and for some unknown reason, reduces the intensity of the reaction that takes place between the nickelous oxide and the steel base during firing of the glass to thereby decrease the boiling of the glass and eliminate copperheading defects in the glass surface. The barium phosphate cooperates with the nickelous oxide to eliminate the boiling defects in the glass while maintaining all of the advantages which are inherent with the use of the nickelous oxide coating.

Other objects and advantages of the invention will appear in the course of the following description.

The drawing illustrates the best mode presently contemplated of carrying out the invention.

The drawing illustrates a composite structure including a ferrous base 1 coated with a glass composition 2 and having an intermediate layer of coating 3.

The base 1 may take the form of any ferrous metal, such as relatively low carbon steel, commonly referred to as enameling iron and having a carbon content of .01% to .03%, higher carbon steel having a carbon content up to .30% or cast iron.

The intermediate coating 2, which is applied to the ferrous base, is essentially barium phosphate such as either barium orthophosphate, $Ba_3(PO_4)_2$, or barium metaphosphate, $Ba(PO_3)_2$.

The barium phosphate is applied to the ferrous base in an amount of .02 to 4.6 grams of dry barium phosphate per square foot of ferrous base and most preferably in the range of 0.4 to 2.3 grams per square foot of ferrous base.

The barium phosphate concentration should be maintained below 4.6 grams per square foot of ferrous surface for an amount in excess of this tends to impair the bond between the glass and the ferrous base. An amount of barium phosphate less than .02 gram per square foot of ferrous base has no appreciable effect in decreasing the boiling defects in the glass.

The coating 3 of barium phosphate can be applied in any conventional manner to the ferrous surface so as to obtain the above mentioned concentration on the ferrous surface. It has been found that an aqueous spray is a convenient method of applying the coating, and in this regard, an aqueous suspension which has proven very satisfactory has the following composition in weight percent:

| | Percent |
|---|---|
| Barium phosphate | 2–28 |
| Bentonite | 0–5 |
| Sodium nitrite | 0–3 |
| Water | Balance |

The bentonite is a form of clay which is a conventional suspending agent and tends to maintain the nickelous oxide and barium phosphate in suspension in the water. The sodium nitrite serves as a rust inhibitor. These materials, namely the bentonite and the sodium nitrite, do not have any appreciable effect on the chemical reaction occurring during the firing of the glass to the ferrous base or on the characteristics or properties of the glass coating applied to the ferrous base. It is desirable, however, when using a filler or a suspending agent, to use one that has a minimum of chemically combined water which will dissociate at elevated temperatures to form nascent hydrogen in the glass-steel fusion reaction.

The barium phosphate and other additions should have a particle size finer than 200 mesh to prevent excessive localized concentrations of the materials on the ferrous surface. It has been found that a particle size of the ingredients in the aqueous suspension in which 97% passed through a 325 mesh sieve will provide very satisfactory results.

The glass composition 2 to be applied to the coated ferrous base may be any of the conventional glass compositions ordinarily used in the vitreous enamel art. As the barium phosphate itself does not serve to promote adherence between the glass and the ferrous metal, it is necessary that adherence promoting oxides in the glass composition or that other adherence promoting materials be applied to the ferrous base in order to bring about the required adherence between the glass and the steel.

The barium phosphate serves to provide a more smoothly firing glass by reducing the boiling tendencies during the firing operation. The reduction of boiling not only reduces the boiling, pitting and copperheading defects in the glass surface but also reduces the amount of bubbles in the glass coating and provides a more dense layer of glass which increases the effectiveness of the coating in terms of corrosion resistance.

In carrying out the process of the invention, the ferrous base 1 is initially cleaned by any conventional method, such as pickling, sandblasting, grit blasting or the like.

The barium phosphate coating in the form of an aqueous suspension is then applied to the clean ferrous base by any conventional means, such as spraying, dipping, slushing or the like. It is contemplated that the coating may also be applied to the ferrous base in a dry form or in other liquid forms rather than the aqueous suspension, if desired.

After the coating has been applied in the form of an aqueous suspension to the ferrous base, it is then dried preferably by heating the steel to a temperature in the range of 100° to 400° F. If the coating is applied in the dry form, no drying operation is required.

After the coating has been dried, a layer of the glass composition 2 is applied to the coated base. The glass composition may take the form of any of the conventional glasses or vitreous enamel normally applied to ferrous bases. The glass coating is then fired at an elevated temperature in the range of 1000° F. to 1600° F. to fuse the glass to the ferrous base.

In a modified form of the invention, the coating 3 consists of a mixture of barium phosphate and nickelous oxide and is applied to a steel base having a carbon content up to 0.3%. It has been found that the lower valent form of nickel oxide, nickelous oxide, tends to eliminate hydrogen defects, such as fishscaling, in the glass surface and promotes adherence between the glass and the steel. The barium phosphate combines with the nickelous oxide during the firing operation to reduce the intensity of the reaction at the glass-steel interface to thereby eliminate the boiling tendencies brought about by the nickelous oxide and yet maintain the advantages inherent with the use of the nickelous oxide coating.

Other compounds of nickel, including nickelic oxide, do not provide the advantages of nickelous oxide, and similarly, while cobalt and nickel in many respects have similar properties, it has been found that cobaltous oxide, when applied to steel will not function in the manner of nickelous oxide to bring about the decrease in fishscaling defects.

In the modified form of the invention, the coating 3 contains barium phosphate in the amount of .02 to 4.6 grams of dry barium phosphate per square foot of steel base and contains nickelous oxide in the amount of .05 to 1.0 gram per square foot of the steel base.

If the amount of the nickelous oxide coating on the steel is above the aforementioned range, there is a tendency for excessive boiling in the glass resulting in pitting which cannot be successfully counteracted by the barium phosphate. A concentration of nickelous oxide below .05 gram per square foot of the steel base will not bring about the desired reduction in hydrogen defects.

The mixture of barium phosphate and nickelous oxide can be applied to the steel as an aqueous suspension having the following composition range in weight percent:

|  | Percent |
| --- | --- |
| Nickelous oxide | 2–10 |
| Barium phosphate | 2–28 |
| Bentonite | 0–5 |
| Sodium nitrite | 0–3 |
| Water | Balance |

The mixture of barium phosphate and nickelous oxide is applied to the steel base in a manner similar to that used with barium phosphate alone. In addition, it is contemplated that the nickelous oxide and barium phosphate can be applied separately as long as the concentration of both compounds is within the aforementioned range.

The nickelous oxide serves to promote adherence between the glass and steel base and also substantially eliminates fishscaling defects in the glass surface. The barium phosphate cooperates with the nickelous oxide to lessen the intensity of the reaction of the nickelous oxide and the glass to thereby reduce the boiling tendencies and provide a more dense glass while maintaining the advantages of the nickelous oxide coating.

Example 1

A six inch by twelve inch by .088 inch SAE 1015 hot rolled, rimmed plate was blasted with steel grit to remove scale and surface dirt. After blasting, an aqueous suspension having the following composition was sprayed on the clean steel plate:

|  | Parts by weight |
| --- | --- |
| Barium metaphosphate | 10 |
| Bentonite | 4 |
| Sodium nitrite | 0.9 |
| Water | 86.1 |

The plate was then dried for 5 minutes under infrared lamps at a temperature of 200° F. and the resulting coating had a total solids concentration of 2.9 grams per square foot or a concentration of dry barium phosphate of 2.0 grams per square foot.

A glass slip containing a frit and a conventional mill addition was then applied to the coated steel by spraying. The frit had the following composition in weight percent:

|  | Percent |
| --- | --- |
| Silica | 50.8 |
| Sodium oxide | 19.8 |
| Calcium oxide | 5.9 |
| Aluminum oxide | 5.5 |
| Boron oxide | 18.8 |
| Cobalt oxide | 0.5 |

The glass coated steel was then fired at a temperature of 1580° F. for a period of 8 minutes to fuse the glass to the steel. The resulting glass coated steel was free of boiling and copperheading defects.

Example 2

A six inch by six inch by .088 inch SAE 1020 cold rolled rimmed steel plate was subjected to steel shot blasted to remove the scale. The plate was then made the cathode in an aqueous bath containing 7% $H_2SO_4$ and .05% of $As_2O_5$. A current density of 30 amperes per square foot was applied to the electrolytic circuit for 7 minutes to generate hydrogen at the steel cathode and cause the hydrogen to penetrate into the steel to enlarge the voids therein as set forth in the process of Patent No. 2,754,222. The bath was operated at a temperature of 160° F.

The steel plate was then removed from the bath and immersed in boiling water for 5 minutes to remove a substantial proportion of the hydrogen, neutralized in a dilute-alkalized solution and dried.

An aqueous solution of barium phosphate similar to that set forth in Example 1, was applied to the steel and dried. The concentration of barium phosphate in the dry coating was determined to be 3.1 grams per square foot of steel surface.

A glass slip containing a frit having the following composition in weight percent was then applied to the coated steel by dipping:

| | Percent |
|---|---|
| Silica | 49.5 |
| Sodium oxide | 14.8 |
| Aluminum oxide | 8.5 |
| Boron oxide | 12.8 |
| Titanium dioxide | 8.0 |
| Cobalt oxide | 1.0 |

The glass coated steel was then fired at a temperature of 1600° F. and the resulting coating was free of boiling and copperheading defects.

*Example 3*

A six inch by 12 inch by .088 inch SAE 1010 hot rolled, rimmed steel plate was sandblasted. After blasting, an aqueous suspension having the following composition was then sprayed on the steel plate:

| | Parts by weight |
|---|---|
| NiO | 7 |
| Barium metaphosphate | 3 |
| Bentonite | 4 |
| Sodium nitrite | 0.9 |
| Water | 75 |

The sprayed plate was then dried for 4 minutes under infra-red lamps at a temperature of 200° F. and the resulting dried coating had a total solids concentration of 0.7 gram per square foot. This resulted in a concentration of dry nickelous oxides of 0.33 gram per square foot and a concentration of dry barium metaphosphate of 0.14 gram per square foot.

A glass slip containing a frit having the following composition in weight percent was then applied to the coated steel by spraying:

| | Percent |
|---|---|
| Silica | 56.0 |
| Felspar | 15.0 |
| Borax | 12.0 |
| Soda ash | 7.0 |
| Sodium nitrite | 5.0 |
| Fluorspar | 5.0 |

The glass coated steel was then fired at a temperature of 1580° F. for a period of 8 minutes to fuse the glass to the steel. The resulting glass coated steel was free of fishscaling, boiling defects and copperheading and the glass had excellent adherence to steel.

*Example 4*

A six inch by six inch by .047 inch SAE 1008 cold rolled, rimmed steel plate was cleaned by pickling in a 7% aqueous solution of sulphuric acid at 140° F. for 6 minutes. After pickling, the plate was rinsed in water and then dipped in dilute alkaline solution containing sodium carbonate and borax to delay rusting.

The pickled plate was then coated with a composition similar to that set forth in Example 1, and dried in a similar manner. The dried coating had a total solids concentration of 0.2 gram per square foot resulting in a dry nickelous oxide concentration of 0.095 gram per square foot and a dry barium phosphate concentration of 0.04 gram per square foot.

A glass slip containing a frit having the following composition in weight percent was then applied to the dried coated steel by dipping:

| | Percent |
|---|---|
| Sodium silica fluoride | 7.5 |
| Dehydrated borax | 21.3 |
| Potassium nitrate | 9.2 |
| Boric acid | 5.8 |
| Silica | 38.8 |
| Titanium dioxide | 17.4 |

The glass coated steel was then fired at a temperature of 1500° F. and the resulting glass coating was free of fishscaling, boiling defects and copperheading and had excellent adherence to the steel base even though no adherence promoting oxides, such as cobalt oxide, were employed in the glass.

*Example 5*

A steel sample, similar to that set forth in Example 1, was sandblasted and coated with an aqueous suspension having the following composition:

| | Parts by weight |
|---|---|
| Nickelous oxide | 6 |
| Barium orthophosphate | 6 |
| Bentonite | 2 |
| Sodium nitrite | .09 |
| Water | 75 |

The sprayed plate was then dried as set forth in Example 1 and the dried coating had a total solids concentration of 1.2 grams per square foot of steel surface resulting in a nickelous oxide concentration of 0.48 gram per square foot and a barium phosphate concentration of 0.48 gram per square foot.

A glass slip containing a frit having the following composition in weight percent was then applied to the coated steel by spraying:

| | Percent |
|---|---|
| Silica | 54.0 |
| Felspar | 15.0 |
| Borax | 12.0 |
| Soda ash | 7.0 |
| Sodium nitrate | 5.0 |
| Fluorspar | 5.0 |
| Chromium oxide | 2.0 |

The glass coated steel was then fired at a temperature of 1580° F. for a period of 8 minutes to fuse the glass to the steel. The resulting glass coated steel was free of hydrogen defects and had excellent adherence to the steel base.

*Example 6*

A ⅝" x 4" x 6" ASTM 60–45–10 cast iron plate was sandblasted to remove scale and surface dirt. An aqueous suspension of barium metaphosphate, similar to that of Example 1, was sprayed on the plate and dried. The dried coating had a total weight of 4.0 grams per square foot of cast iron plate and/or a concentration of dry barium phosphate of 2.7 grams per square foot.

The plate was then coated with a glass slip containing a standard mill addition and a frit having the following composition by weight:

| | Percent |
|---|---|
| Silica | 59.5 |
| Sodium oxide | 14.8 |
| Aluminum oxide | 3.5 |
| Boron oxide | 7.8 |
| Titanium dioxide | 8.0 |
| Cobalt oxide | 1.0 |

The plate was then fused at a temperature of 1550° F. to fuse the glass to the cast iron base, and the resulting article was free of boiling, pitting and copperheading defects.

The barium phosphate coating of the invention lessens the intensity of the reaction at the steel-glass interface and results in the glass firing more smoothly with a substantial decrease in copperheading, pitting and bubble defects.

The combination of nickelous oxide and barium phosphate in the intermediate coating provides improved adherence between the glass and the steel base and eliminates the use of adherence promoting oxides, such as cobalt oxide, in the glass composition. The elimination of the dark blue-colored cobalt oxide in the glass permits various colored or white glasses to be applied directly to the steel base in a single coat.

Various modes of carrying out the invention are contemplated as being within the scope of the following

I claim:

1. A vitreous enamel base stock, comprising a steel base having a nickelous oxide and barium phosphate coating thereon, said nickelous oxide being present in the coating in an amount of 0.05 to 1.00 gram per square foot of steel base and said barium phosphate being present in the coating in an amount of 0.02 to 4.6 grams per square foot of steel base.

2. A vitreous enamel coated metal article, comprising a carbon steel base having a surface to receive a vitreous enamel coating, and a coating of vitreous enamel substantially free of boiling defects fired to the surface of the steel base, said surface being prepared for the application of said vitreous enamel by initially coating said surface with an aqueous suspension of barium phosphate and thereafter drying said suspension at a temperature below the oxidation temperature of the barium phosphate to provide a concentration of barium phosphate of 0.02 to 4.6 grams of dry barium phosphate per square foot of steel surface.

3. A vitreous enamel coated metal article, comprising a ferrous base having a surface to receive a vitreous enamel coating, and a coating of vitreous enamel substantially free of fishscaling and other hydrogen defects fired to the surface of said ferrous base, said surface being prepared for the application of said vitreous enamel by initially applying a layer of interspersed particles of nickelous oxide and barium phosphate to said surface with said nickelous oxide being applied in an amount of 0.05 gram to 1.00 gram of dry nickelous oxide per square foot of said surface and said barium phosphate being applied in an amount of 0.02 to 4.6 grams of dry barium phosphate per square foot of said surface, said nickelous oxide serving to reduce fishscaling of the vitreous enamel during firing and said barium phosphate operating to decrease the reaction between the nickelous oxide and the ferrous base to thereby minimize boiling of the vitreous enamel.

4. A method of glass coating steel having a carbon content up to .30% comprising cleaning the steel, applying a coating of nickelous oxide and barium phosphate directly to the cleaned steel with the nickelous oxide having a concentration in the range of 0.05 to 1.00 gram of dry nickelous oxide per square foot of steel surface and the barium phosphate having a concentration of 0.02 to 4.6 grams of dry barium phosphate per square foot of steel surface, applying a glass composition substantially free of adherence promoting oxides directly to the coated steel, and firing the steel at an elevated temperature to fuse the glass coating to the steel.

5. A method of applying a glass or vitreous enamel coating to a steel base to eliminate boiling and hydrogen defects in the coating and promote adherence between the glass and the steel, comprising spraying an aqueous suspension of nickelous oxide and barium phosphate directly on the steel base, drying the suspension on the steel base with said dried coating containing finely divided nickelous oxide particles in an amount of 0.05 to 1.00 gram per square foot of steel base and containing finely divided particles of barium phosphate in an amount of 0.02 to 4.6 grams per square foot of steel base, applying a glass composition to the coated steel base, and firing the steel base at an elevated temperature to fuse the glass composition to the steel.

6. A method of glass coating a steel base, comprising cleaning the steel base, coating the steel base with an aqueous suspension of a mixture of the lower valent form of nickel oxide and barium phosphate, said nickel oxide being applied to the steel with a concentration of 0.05 to 1.00 gram per square foot of said steel base and said barium phosphate being applied to said steel base with a concentration of 0.02 to 4.6 grams per square foot of steel base, drying the mixture on the steel base to provide a coating thereon, applying a light colored glass composition directly to the coated steel, and firing the steel at an elevated temperature to fuse the glass composition to the steel base.

7. A method of applying vitreous enamel to steel, comprising cleaning the steel surface to be glassed, and thereafter applying a homogeneous mixture of nickelous oxide and barium phosphate directly to the cleaned steel, said nickelous oxide being applied to the steel in an amount of 0.05 to 1.00 gram of dry nickelous oxide per square foot of steel base and said barium phosphate being applied to the steel base in an amount of 0.02 to 4.6 grams of dry barium phosphate per square foot of steel base, applying a vitreous enamel composition to the coated steel base, and firing the steel at an elevated temperature to fuse the vitreous enamel composition to the steel base, said nickelous oxide serving to reduce the fishscaling during firing of the vitreous enamel and said barium phosphate operating to decrease the reaction between the nickelous oxide and the steel to thereby minimize boiling of the vitreous enamel.

8. A method of glass coating a ferrous article to eliminate boiling defects in the glass comprising heating the ferrous article, applying an aqueous suspension of barium phosphate selected from the group consisting of $Ba(PO_3)_2$ and $Ba_3(PO_4)_2$ directly to the cleaned article, drying the barium phosphate at a temperature below the oxidation temperature of the barium phosphate to provide a dry barium phosphate concentration in the range of 0.02 to 4.6 grams per square foot of surface, applying a glass composition to the coated ferrous article as a separate coating, and firing the article at an elevated temperature to fuse the glass coating to the ferrous article.

9. A method of glass coating steel to eliminate boiling defects in the glass coating, comprising applying a coating of barium phosphate to the steel, drying the barium phosphate coating at a temperature below the oxidation temperature of the barium phosphate to provide a concentration of barium phosphate in the range of 0.02 to 4.6 grams of dry phosphate per square foot of steel surface, applying a glass composition to the coated steel, and firing the steel at an elevated temperature to fuse the glass composition to the steel.

References Cited in the file of this patent
UNITED STATES PATENTS

| | | |
|---|---|---|
| 2,120,212 | Curtin | July 7, 1938 |
| 2,438,013 | Tanner | Mar. 16, 1948 |
| 2,528,787 | Roland | Nov. 7, 1950 |
| 2,569,453 | Chester et al. | Oct. 2, 1951 |
| 2,570,299 | Zademach et al. | Oct. 9, 1951 |
| 2,809,907 | Cramer | Oct. 15, 1957 |